United States Patent [19]

Barske

[11] 4,288,705

[45] Sep. 8, 1981

[54] MECHANISM FOR REGULATING A WIPER MOTOR IN A VEHICLE

[75] Inventor: Heiko Barske, Ingolstadt, Fed. Rep. of Germany

[73] Assignee: Audi Nsu Auto Union, Ingolstadt, Fed. Rep. of Germany

[21] Appl. No.: 112,424

[22] Filed: Jan. 16, 1980

[30] Foreign Application Priority Data

Jan. 20, 1979 [DE] Fed. Rep. of Germany ....... 2902175

[51] Int. Cl.³ .................... G05D 3/10; H02H 7/085
[52] U.S. Cl. .................... 307/10 R; 307/115; 307/142; 15/250.17; 318/466; 318/DIG. 2
[58] Field of Search .................... 307/10, 9, 113, 115, 307/134, 142, 140, 154; 361/189, 194; 15/250.17; 318/DIG. 2, 443, 406, 408, 409

[56] References Cited

U.S. PATENT DOCUMENTS 2,761,537  9/1956  Short .................... 15/250.17
3,253,206  5/1966  Romanowski .................... 15/250.17

Primary Examiner—L. T. Hix
Assistant Examiner—Stafford D. Schreyer
Attorney, Agent, or Firm—Cushman, Darby & Cushman

[57] ABSTRACT

An electrical, vehicle wiper, motor regulator which prevents the wiper motor from automatically starting up when the vehicle ignition is turned on. The regulation includes a holder circuit which prevents the wiper motor from being driven when the ignition is turned on, even when the wiper ON/OFF switch had previously been left on, in those wiper systems which include a terminal switch for automatically returning the wipers to normal resting position.

5 Claims, 3 Drawing Figures

MECHANISM FOR REGULATING A WIPER MOTOR IN A VEHICLE

BACKGROUND OF THE INVENTION

The invention relates to a mechanism for regulating a wiper motor in a vehicle.

In the traditional wiper regulators, the electrical circuit for the wiper motor is coupled to a wiper switch in series with the ignition switch so that the wipers are automatically turned off when the ignition is turned off. A feature of the commonly used circuit is that when the ignition is turned on again the wipers begin to wipe once again if the wiper switch was not turned off beforehand. This also is the case for wiper regulators with an automatic return to the final position because the wipers are immediately deactivated when the ignition is switched off (normally not in the final position) and when the ignition is switched on again, even when the ON/OFF switch is turned off, it strives to reach its final (resting) position. Very often, the wipers are not turned off but rather are switched into the interval wiping position. This type of interval switch only makes the wipers activate during specified time intervals by means of a time switch so that when the driver turns off the vehicle motor he is not reminded to switch off the wipers even if the wipers are running. If the wiper electrical circuit is only interrupted by turning off the ignition switch, then when the ignition is turned on again the interval circuit is activated again. All these familiar circuits have the idiosyncrasy that the wipers can only be turned on when the ignition switch is turned on, which can lead to destruction of the wiper blades in the case of wipers frozen solid to the window when they are jolted away from the window, or if the windshield wipers do not budge, it can lead to an excessive strain and destruction of the motor or of the wipers themselves. In particular, with a regulator with automatic switching off of the wipers at its end positions, the driver will suffer these consequences if the wipers are coincidentally frozen out of the resting position because the wipers, even upon subsequent turning off with the ON/OFF switch on the dashboard, will strive to reach their resting position when the ignition is switched on.

An object of the present invention is to create a mechanism for regulating a wiper motor in a vehicle, which prevents the wipers from starting up unintentionally when the ignition is turned on. This objection is fulfilled with the circuit having the features of the present invention.

BRIEF SUMMARY OF THE INVENTION

With the mechanism provided by the invention, the result achieved is that after the wipers have been turned off by turning off the ignition switch, the wiper switch (ON/OFF switch) has to be activated again to get the windshield wipers going again. In this way wipers that are frozen onto the windshield will not be automatically jolted into activity when the ignition is turned on but rather must be consciously activated by the driver after the windshield ice has melted. In this way, any destruction of or damage to the sensitive wiper blades due to their being ripped away from the windshield can be prevented. For windshield wipers that are frozen solid to the windshield and which cannot be moved even when the motor is turned on, any excess strain and possible destruction of the motor or of the wiper rods is eliminated.

In a first embodiment, a simple model of an ON/OFF switch with two contacts for a simple wiper regulator system not having an automatic resting position switch is demonstrated.

In accordance with a second embodiment of the invention which may be utilized in wiper systems which include an automatic resting position switch for the wipers, mandatory startup of the wipers which cannot be controlled by the driver should they be in an intermediate position is avoided when the ignition switch is turned on.

A simple and inexpensive design of an ON/OFF switch with wiper contacts for use in the arrangement according to the second embodiment is provided.

BRIEF DESCRIPTION OF THE DRAWINGS

The invention is explained in an exemplary way and further details are provided with the aid of the drawings in which.

DETAILED DESCRIPTION OF THE PREFERRED EMBODIMENTS

Figure 1:
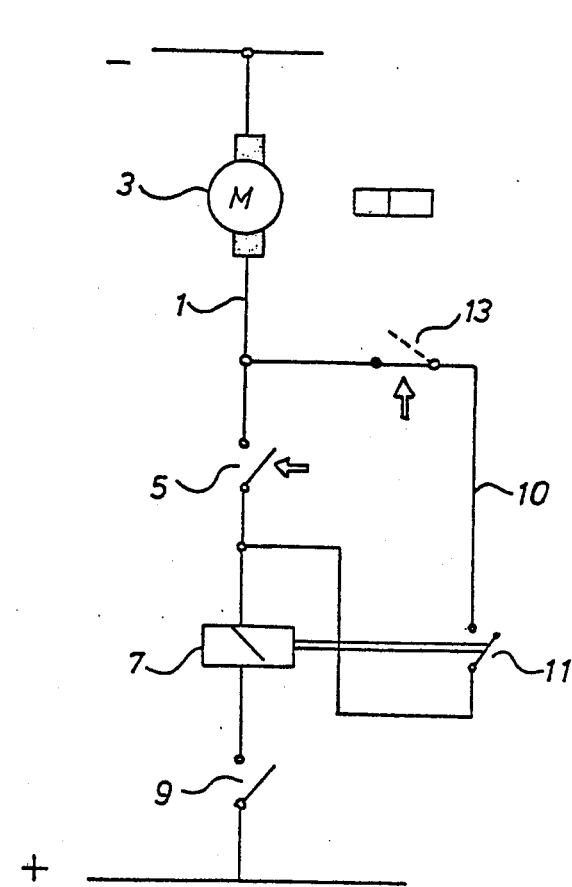
FIG. 1 shows a regulator switch with an ignition switch, an ON/OFF switch and a holding (latching) switch in accordance with a first embodiment of the present invention.

According to FIG. 1, an ON touch contact (5), a holder (latching) relay (7), and an ignition switch (9) are in series in the electrical circuit of a wiper motor (3). The ON touch contact (5) is bridged by a holder circuit (latching circuit) (10) in which a contact (11) of the holder relay (7) and an OFF button (13) are located.

The circuit has the following effect:

When the driver wants to turn on the wipers when the ignition has been turned on, the ignition switch (9) is closed. The ON touch contact (5) is closed for a short period of time so that electricity flows through the winding of the holder relay (7) and attracts the contact (self-maintenance switch) (11). In this way, the holder circuit (10) is closed (the contact of the OFF button (13) is closed when not activated) and the ON button (5) is bridged. The circuit therefore maintains itself and the flow of electricity to the wiper motor (3) continues until either the OFF button (13) is activated for a short period of time by the driver or is interrupted by the ignition switch (9) upon turning off the vehicle. Upon activation of OFF button (13) or opening of ignition switch (9) current ceases in holder relay 7 and holder circuit (10). Thus, if the ignition switch is again closed, no power will be delivered to the wiper motor (3) because there is no closed current path. Only when the ON button (5) closes again does current re-enter the wiper motor through ON switch (5) and then holder circuit (10).

The ON button (5) and the OFF button (13) can be put together in a ON/OFF bascule which can be activated from both sides with a spring between them which either bias a contact open or closes it.

Figure 2:
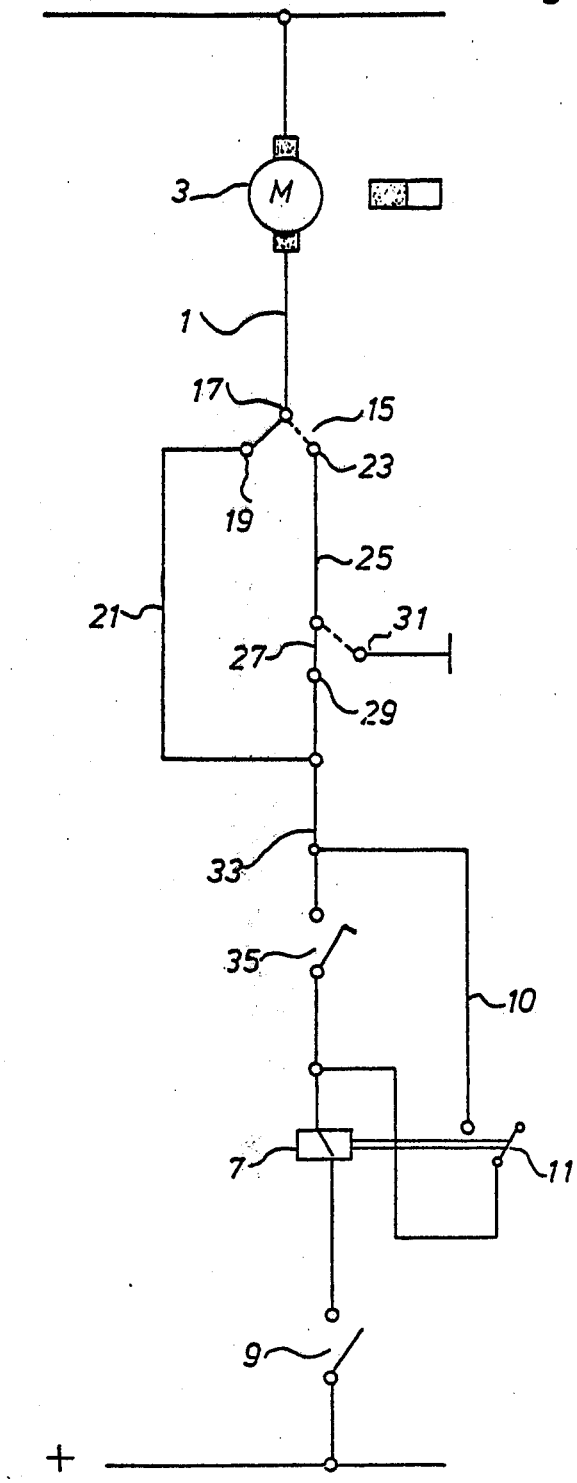
FIG. 2 shows a regulator switch in accordance with a second embodiment of the invention for use in a vehicle having an additional automatic wiper resting position turn-off switch.

In FIG. 2, an ON/OFF switch (15) is located in the electricity circuit (1) of the wiper motor (3) the two way contacts of which in the ON position connects point (17) with point (19) and in the OFF position, connects point (17) with point (23). From point (23) a wire (25) leads to the terminal switch (27) which switches from point (29) to the adhesively connected point (31) when the wiper reaches its resting position. A bridging wire (21) goes from point (19) to point (29) of the terminal switch (27). Another wired section (33), similar to the circuitry shown in FIG. 1, is connected to the bridging wire (21) and connected to the wire (25) through switch 27. Section (33) includes the holder relay (7) with its contact (11) and attached holding circuit (19), the ignition switch (9), and a mutual wiper contact (35) which is activated with the ON/OFF switch (15). By turning on the ON/OFF switch (15) (connecting points (17) and (19)), the wiper contact (35) closes for a short period of time. A more exact description of the switch is provided further below.

The circuit shown in FIG. 2 has the following effect:

(a) If the driver turns on the wiper by using the ON/OFF switch (15) with the ignition switch closed and later turns the wiper off again, the circuit will operate in the following manner:

The ignition switch (9) is closed and the ON/OFF switch (15) is turned on by connecting point (17) with point (19). Simultaneously, the wiper contact (35) is closed for a short period of time. The electrical circuit to the wiper motor is therefore closed across the bridging wire (21), the wiper contact (35), and the ignition switch (9). Electricity then flows through holder relay (7) causng switch (11) to close thereby bridging the reopening wiper contact (35) so that the flow of electricity to the wiper motor (3) can be maintained. The terminal switch (27) moves with each complete cycle of the wipers from its point (29) to point (31) but is ineffective to effect the conduction electricity to the wiper motion because of the interruption between point (17) and point (23). When the wipers are turned off, point (17) is connected with point (23), and with that, the bridging of the terminal switch (23) is discontinued. If the wipers do not coincidentally come to their resting position when they are switched off, then the terminal switch 27, as demonstrated, connects with point (29). The wipers then continue to move until they assume their resting position and thereby causing terminal switch (27) to switch from point (29) to point (31) and the motor stops. In order to achieve this, the self-maintenance switch 11 of the holding relay (7) is not allowed to open (current is maintained in holding relay 7) when the ON/OFF switch is reswitched from point (19) to point (23). During the reswitching process, then, point (19) and point (23) must be connected for a short period of time with point (17) (see switch in FIG. 3). When the wipers have achieved their resting position, the electrical circuit to the wiper motor (3) is interrupted and switch 11 is opened.

(b) If the driver has turned off the vehicle (ignition switch (9) is open) and the ON/OFF switch (15) is left in the ON position (connection from (17) to (19)), whereby the wipers have been turned off in an intermediate position (terminal switch (27) is connected to point (29)), then the circuitry will operate in the following manner:

When the ignition is turned on again and with that, the ignition switch is closed, then the electrical circuit remains open circuited because the holding relay (7) is inoperative (switch (11) is open and wiper contact (35) is open). Now, for example, if the wiper blades are frozen to the windshield in an intermediate position, the driver can wait until the windshield wipers have separated somewhat as a result of the effects of the windshield defroster and thereupon he can activate the ON/OFF switch (15) to the OFF position. In this case, for the short period of time of the switching process, point (17) is connected with point (19) and point (23) and simultaneously the wiper contact (35) is closed for a short period of time. The holding switch is then activated again, the wipers are directed to their resting position and the holding switch is once again broken off as a result of the open circuiting of the electrical circuit across the terminal switch (27), thereby causing the wiper motor (3) to be turned off.

Figure 3:
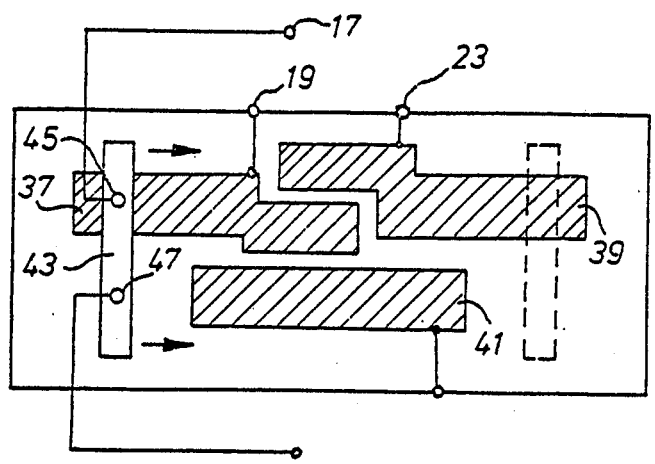
FIG. 3 shows the scheme of the wiper contact and ON/OFF switch used in the embodiment shown in FIG. 2.

In FIG. 3, a push switch with contact strips (37, 39, 41) and with a push part (43) with friction contacts (45 and 47) is demonstrated schematically. The contact strips overlap in a central switching area. The demonstrated (full line) position of the push part (43) in connection with the reference illustration corresponds to the demonstrated (full line) positions of the ON/OFF switch (15) and of the wiper contact (35) in FIG. 2, whereby the friction contact 47 and the contact strip (41) correspond to the wiper contact (35). In the motion of the push part (43) from the full line illustrated ON position to the dashed line illustrated OFF position (shown in FIG. 3), an area is passed through in which, on the one hand, the wiper contact (friction contact (47) and contact strip (41)) is closed and, on the other hand, point (17) is connected to both point (19) (ON position) and point (23) (OFF position).

The switch can also be designed as a rotating switch whereby the contact strip (41) is on a second switch level.

What is claimed is:

1. A wiper motor regulator for use in a vehicle having an ignition switch, a wiper, a wiper motor for driving the wiper, and an electrical power source coupled to the ignition switch, said regulator comprising:
   first switch means for coupling said wiper motor to a terminal;
   means for conducting electric current between said ignition switch and said terminal;
   means for latching a circuit path around said first switch means whenever said first switch means and said ignition switch are both conducting current;
   said latching means including:
   second and third switch means, series connected, for coupling said wiper motor to a point on said conducting means between said ignition switch and said first switch means, and
   means, responsive to current in said conducting means between said point and said ignition switch, for closing said second switch means, said closing means including means for opening said second switch means when said current is discontinued so as to delatch said current path.

2. A wiper motor regulator for use in a vehicle having an ignition switch, a wiper, a wiper motor for driving the wiper toward and away from an end position, and an electrical power source coupled to the ignition switch, said regulator comprising:
   a first terminal and a second terminal;
   first switch means, disposable in a first, second or third state, for coupling said wiper motor to said first or to said second or to both of said first and second terminals, respectively, when said first switch means is disposed in said first, second or third state, said first switch means coupling to both of said first and second terminals during transition between said first and second states;

second switch means for coupling said second terminal to said first terminal except when said wiper is in said end position;

third switch means for coupling said first terminal to said ignition switch whenever and only when said first switch means couples said wiper motor to both of said first and second terminals; and means for latching a circuit path around said third switch means whenever said third switch means couples said first terminal to said ignition switch and said ignition switch is closed;

said latching means including means for delatching said circuit path whenever said ignition switch is opened or said wiper is in said end position and said first switch means is in said second state.

3. A wiper motor regulator as in claim 2 wherein said latching means further including:

fourth switch means, responsive to current through said third switch means, for coupling said first terminal with said ignition switch, said fourth switch means being responsive to discontinuance of current through said ignition switch to break said fourth switch means coupling.

4. A wiper regulator as in claim 2 or claim 3 wherein said first switch means comprises an electrically conductive first slidable contact member, said first and second terminals respectively comprising first and second conductive wiper strips arranged in fixed relation so as to be slidably contactable with said first slidable contact, said first and second wiper strips having an overlapping switch area where said first slidable contact may concurrently engage both of said first and second strips, said third switch means comprising a contact switch including a third conductive wiper strip disposed in fixed relation to said first and second strips and a second conductive slidable contact member disposed in fixed relation to said first contact member such that said second contact member engages said third strip to close said contact switch when said first contact member concurrently engages said first and second strips.

5. Mechanism to regulate a wiper motor in a vehicle for which an ignition switch and an on/off switch for the wiper motor are in the electrical circuit of the wiper motor characterized by a holding circuit which is activated only by the turned on ignition switch and subsequently by the on/off switch and in this way activates the wiper motor and which discontinues when the ignition switch is turned off and also turns off the wiper motor.

* * * * *